United States Patent
Ohta et al.

(10) Patent No.: US 12,261,303 B2
(45) Date of Patent: Mar. 25, 2025

(54) LITHIUM ION SECONDARY BATTERY ELECTRODE AND METHOD FOR MANUFACTURING THE SAME

(71) Applicant: HONDA MOTOR CO., LTD., Tokyo (JP)

(72) Inventors: Masahiro Ohta, Saitama (JP); Takuya Taniuchi, Saitama (JP)

(73) Assignee: HONDA MOTOR CO., LTD, Tokyo (JP)

(*) Notice: Subject to any disclaimer, the term of this patent is extended or adjusted under 35 U.S.C. 154(b) by 192 days.

(21) Appl. No.: 17/456,880

(22) Filed: Nov. 29, 2021

(65) Prior Publication Data

US 2022/0173406 A1    Jun. 2, 2022

(30) Foreign Application Priority Data

Dec. 2, 2020 (JP) ................. 2020-200013

(51) Int. Cl.

| | |
|---|---|
| *H01M 4/76* | (2006.01) |
| *H01M 4/62* | (2006.01) |
| *H01M 4/66* | (2006.01) |
| *H01M 10/0525* | (2010.01) |

(Continued)

(52) U.S. Cl.
CPC ........... *H01M 4/762* (2013.01); *H01M 4/624* (2013.01); *H01M 4/661* (2013.01); *H01M 4/667* (2013.01); *H01M 10/0525* (2013.01); *H01M 50/533* (2021.01); *H01M 2004/021* (2013.01)

(58) Field of Classification Search
CPC ........ H01M 4/762; H01M 4/742; H01M 4/74; H01M 4/70; H01M 4/624; H01M 4/628; H01M 4/661; H01M 4/667; H01M 4/666
See application file for complete search history.

(56) References Cited

U.S. PATENT DOCUMENTS

2020/0212450 A1    7/2020  Shimizu et al.

FOREIGN PATENT DOCUMENTS

| CN | 100413121 | * | 8/2008 | .......... H01M 10/052 |
| CN | 109428123 | * | 3/2019 | .......... H01M 10/0585 |
| CN | 111370705 A | | 7/2020 | |

(Continued)

OTHER PUBLICATIONS (Computer-generated translation of CN 109428123) Xiao et al., "Method for Producing a Lithium Ion Battery Cell", Mar. 5, 2019.*

(Continued)

*Primary Examiner* — Raymond Alejandro
(74) *Attorney, Agent, or Firm* — CKC & PARTNERS CO., LLC

(57) ABSTRACT

Provided are a lithium ion secondary battery electrode that occurrence of short-circuit and contamination can be reduced and the method for manufacturing such a lithium ion secondary battery electrode. An electrode used for a lithium ion secondary battery includes a current collector formed of a metal porous body. The current collector has a mixture layer impregnated with an electrode material mixture containing an electrode active material and a non-mixture-impregnated portion not impregnated with the electrode material mixture and including a tab portion and a tab converging portion. The surface roughness Ra of the non-mixture-impregnated portion is equal to or less than the surface roughness of the mixture layer.

6 Claims, 1 Drawing Sheet

(51) Int. Cl.
   *H01M 50/533*   (2021.01)
   *H01M 4/02*    (2006.01)

(56) References Cited

FOREIGN PATENT DOCUMENTS

| JP | 2010135342 A | 6/2010 |
| JP | 2014035818 A | 2/2014 |
| JP | 2015125915 A | 7/2015 |
| JP | 2020107441 A | 7/2020 |
| WO | 2020115954 A1 | 6/2020 |
| WO | 2020115955 A1 | 6/2020 |

OTHER PUBLICATIONS (Computer-generated translation of CN 100413121) Kim et al., "Electrode Assembly and the Lithium Rechargeable Battery", Aug. 20, 2008.*
Notification of Reasons for Refusal issued in the JP Patent Application No. 2020-200013, mailed on Nov. 14, 2023.
Office Action issued Jul. 30, 2024 in the CN Patent Application No. CN202111452626.2.

* cited by examiner

LITHIUM ION SECONDARY BATTERY ELECTRODE AND METHOD FOR MANUFACTURING THE SAME

This application is based on and claims the benefit of priority from Japanese Patent Application No. 2020-200013, filed on 2 Dec. 2020, the content of which is incorporated herein by reference.

BACKGROUND OF THE INVENTION

Field of the Invention

The present invention relates to a lithium ion secondary battery electrode and the method for manufacturing such a lithium ion secondary battery electrode.

Related Art

Typically, a lithium ion secondary battery has been in widespread use as a secondary battery having a high energy density. For example, the lithium ion secondary battery has a structure in which a separator is present between a positive electrode and a negative electrode and the lithium ion secondary battery is filled with a liquid electrolyte. In recent years, a technique relating to a lithium ion secondary battery using a solid electrolyte as an electrolyte has been proposed.

Meanwhile, a technique using metal porous bodies as current collectors forming positive and negative electrodes has also been proposed. The metal porous body is used as the current collector so that the inside of the porous body can be impregnated with an electrode material mixture containing an electrode active material. Thus, the energy density of the battery can be further improved.

In the case of using the metal porous body as the current collector, a non-mixture-impregnated portion not impregnated with the electrode material mixture is provided at the metal porous body, and is electrically connected to, e.g., a lead tab. The non-mixture-impregnated portion includes a vacancy portion and a metal portion, and is formed with an uneven surface. For this reason, there is a probability that when the electrodes are, for example, stacked in manufacturing of the lithium ion secondary battery, short-circuit is caused due to contact of part of the non-mixture-impregnated portion with other electrodes or contamination is caused due to cutting of a wire of the metal porous body as a result of stress concentration on raised portions on the surface.

Patent Document 1: Japanese Unexamined Patent Application, Publication No. 2014-035813

SUMMARY OF THE INVENTION

Japanese Unexamined Patent Application, Publication No. 2014-035818 describes that the surface roughness Rmax of an electrode material mixture layer on a solid electrolyte layer side is defined, and in this manner, short-circuit due to penetration of active material particles between positive and negative electrodes is reliably prevented. However, no study has been conducted yet on a technique capable of preventing occurrence of short-circuit and contamination due to the non-mixture-impregnated portion.

The present invention has been made in view of the above-described situation, and an object of the present invention is to provide a lithium ion secondary battery electrode capable of reducing occurrence of short-circuit and contamination and the method for manufacturing such a lithium ion secondary battery electrode.

(1) The present invention relates to an electrode used for a lithium ion secondary battery, the lithium ion secondary battery electrode including a current collector formed of a metal porous body. The current collector has a mixture layer impregnated with an electrode material mixture containing an electrode active material and a non-mixture-impregnated portion not impregnated with the electrode material mixture. The surface roughness Ra of the non-mixture-impregnated portion is equal to or less than the surface roughness of the mixture layer.

According to the aspect (1) of the invention, the lithium ion secondary battery electrode can be provided, which is capable of reducing occurrence of short-circuit and contamination at the non-mixture-impregnated portion where it is important to reduce short-circuit etc. without exchange of lithium ions.

(2) The lithium ion secondary battery electrode according to (1), in which the non-mixture-impregnated portion includes a tab portion having a higher metal density than that of the mixture layer and a tab converging portion formed between the mixture layer and the tab portion and the surface roughness Ra of the tab converging portion is equal to or less than $\frac{1}{10}$ of the thickness of the mixture layer.

According to the aspect (2) of the invention, the lithium ion secondary battery electrode can be provided, which is capable of reducing occurrence of short-circuit due to contact of the tab converging portion with other electrodes and contamination.

(3) The lithium ion secondary battery electrode according to (1) or (2), in which the non-mixture-impregnated portion includes the tab portion having the higher metal, density than that of the mixture layer and the tab converging portion formed between the mixture layer and the tab portion and the surface roughness Ra of the tab converging portion is equal to or less than the average wire diameter of the metal porous body.

According to the aspect (3) of the invention, the lithium ion secondary battery electrode can be provided, which is capable of more preferably reducing occurrence of short-circuit due to contact of the tab converging portion with other electrodes and contamination.

(4) The lithium ion secondary battery electrode according to any one of (1) to (3), in which the non-mixture-impregnated portion includes the tab portion having the higher metal density than that of the mixture layer and the tab converging portion formed between the mixture layer and the tab portion and the surface roughness Ra of the tab portion is equal to or less than $\frac{1}{10}$ of the thickness of the mixture layer.

According to the aspect (4) of the invention, the lithium ion secondary battery electrode can be provided, which is capable of reducing occurrence of short-circuit due to contact of the tab portion with other electrodes and contamination and reducing improper upon welding of the tab portion.

(5) The lithium ion secondary battery electrode according to any one of (1) to (4), in which the non-mixture-impregnated portion includes the tab portion having the higher metal density than that of the mixture layer and the tab converging portion formed between the mixture layer and the tab portion and the surface roughness Ra of the tab portion is equal to or less than the average wire diameter of the metal porous body.

According to the aspect (5) of the invention, the lithium ion secondary battery electrode can be provided, which is capable of mote preferably reducing occurrence of short-circuit due to contact of the tab portion with other electrodes and contamination and reducing improper welding upon welding of the tab portion.

(6) The lithium ion secondary battery electrode according to any one of (1) to (5), in which at least a surface of the non-mixture-impregnated portion is filled with a filler.

According to the aspect (6) of the invention, the surface roughness Ra of the non-mixture-impregnated portion can be easily adjusted.

(7) The lithium ion secondary battery electrode according to (6), in which the filler is at least any of an Insulator and a thermal conductor.

According to the aspect (7) of the invention, occurrence of short-circuit clue to contact of the non-mixture-impregnated portion with other electrodes and contamination can be reduced. Moreover, a preferred heat dissipation effect can be obtained.

(8) The present invention relates to a method for manufacturing a lithium ion secondary battery electrode, the method including the electrode material mixture impregnation step of impregnating part of a current collector formed of a metal porous body with an electrode material mixture and the press step of pressing the current collector such that the surface roughness Ra of a non-mixture-impregnated portion, which is not impregnated with the electrode material mixture, of the current collector reaches equal to or less than $\frac{1}{10}$ of the thickness of the mixture layer.

According to the aspect (8) of the invention, the lithium ion secondary battery electrode can be manufactured, which is capable of reducing occurrence of short-circuit due to contact of the non-mixture-impregnated portion with other electrodes and contamination.

(9) The present invention relates to a method for manufacturing a lithium ion secondary battery electrode, the method including the electrode material mixture impregnation step of impregnating part of a current collector formed of a metal porous body with an electrode material mixture and the press step of pressing the current collector such that the surface roughness Ra of a non-mixture-impregnated portion, which is not impregnated with the electrode material mixture, of the current collector reaches equal to or less than the average wire diameter of the metal porous body.

According to the aspect (9) of the invention, the lithium ion secondary battery electrode can be manufactured, which is capable of preferably reducing occurrence of short-circuit due to contact of the non-mixture-impregnated portion with other electrodes and contamination.

(10) The lithium ion secondary battery electrode manufacturing method according to (8) or (9), the method further including the filler filling step of filling, before the press step, at least a surface of the non-mixture-impregnated portion with a filler.

According to the aspect (10) of the invention, the surface roughness Ra of the non-mixture-impregnated portion can be easily adjusted upon manufacturing of the lithium ion secondary battery electrode.

DETAILED DESCRIPTION OF THE INVENTION

Figure 1:
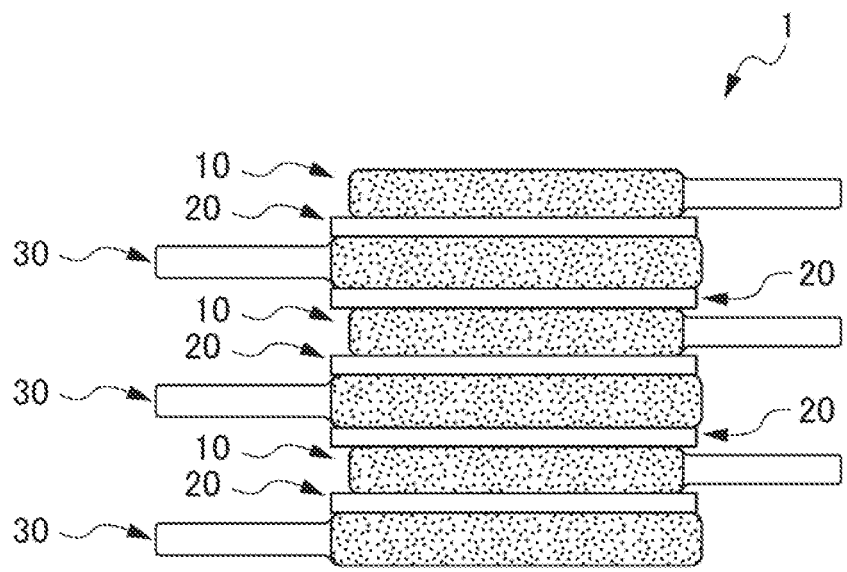
FIG. 1 is a side view showing a lithium ion secondary battery according to one embodiment of the present invention.

Hereinafter, an embodiment of the present invention will be described with reference to the drawings. Note that the embodiment below is an example of the present invention and the present invention is not limited to the embodiment below.

<Lithium Ion Secondary Battery Electrode>

A lithium ion secondary battery electrode according to the present embodiment includes a current collector as a metal porous body. Part of the current collector is impregnated with an electrode material mixture containing an electrode active material, and another part of the current collector is formed with a non-mixture-impregnated portion not impregnated with the electrode material mixture.

A battery to which the lithium ion secondary battery electrode according to the present embodiment is applicable may be one using an electrolytic solution as a liquid electrolyte or one using a solid electrolyte. Moreover, the lithium ion secondary battery electrode according to the present embodiment may be applied to a positive electrode or a negative electrode. Alternatively, the lithium ion secondary battery electrode may be applied to both of the positive and negative electrodes. Note that the lithium ion secondary battery electrode according to the present embodiment is more preferably applied to the positive electrode because the positive electrode is smaller than the negative electrode and the risk of a non-mixture-impregnated portion of the positive electrode contacting the negative electrode is higher.

[Current Collector]

Current collectors forming a positive electrode 10 and a negative electrode 30 are formed of metal porous bodies. The metal porous body has pores formed continuously with each other, and the inside of each pore can be impregnated with an electrode material mixture containing an electrode active material. The metal porous body is not particularly limited as long as the metal porous body has pores formed continuously with each other, and examples of the form of the metal porous body include foamed metal having pores formed by foaming, metal mesh, expanded metal, punched metal, and metal non-woven fabric. Metal used for the metal porous body is not particularly limited as long as such metal has conductivity, and examples thereof include nickel, aluminum, stainless steel, titanium, copper, and silver. Of these materials, foamed aluminum, foamed nickel, and foamed stainless steel can be preferably used as the current collector forming the positive electrode, and foamed copper and foamed stainless steel can be preferably used as the current collector forming the negative electrode.

The current collector as the metal porous body has pores formed continuously with each other, and has a larger surface area than that of a typical current collector as metal foil. The metal porous body is used as the current collector so that the inside of each pore can be impregnated with the electrode material mixture containing the electrode active material. With this configuration, the amount of active material per unit area of an electrode layer can be increased, and as a result, the volumetric energy density of a lithium ion secondary battery can be improved. The electrode material mixture is easily fixed. Thus, unlike a typical electrode using metal foil as a current collector, coating slurry for forming a mixture layer does not need to be thickened when the mixture layer is formed thick. Thus, a binder necessary for thickening, such as an organic polymer compound, can be reduced. Consequently, a capacity per unit area of the electrode can be increased, and the capacity of the lithium ion secondary battery can be increased.

The current collector as the metal porous body includes a linear metal portion and a vacancy portion. The linear metal portion may have a three-dimensional mesh structure. With the above-described metal porous body as the current collector, the current collector is formed with an uneven surface. Due to such a surface, there is a probability that, for example, when the electrode is stacked, short-circuit due to contact of the non-mixture-impregnated portion of the current collector with other electrodes, contamination, etc. are particularly caused. In the lithium ion secondary battery according to the present embodiment, the short-circuit and the contamination as described above can be reduced.

Figure 2:
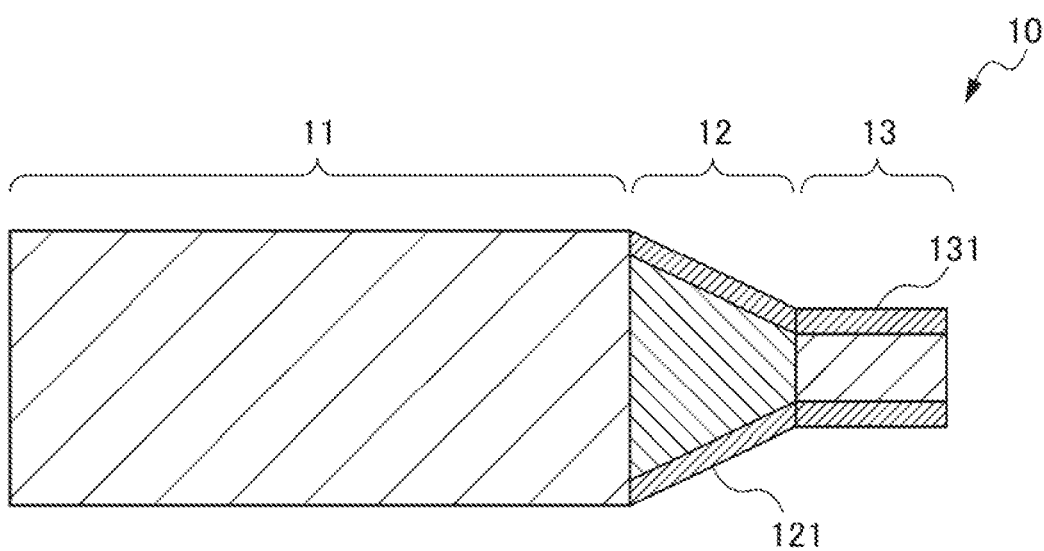
FIG. 2 is a side sectional view showing a lithium ion secondary battery electrode according to one embodiment of the present invention.

Hereinafter, the configuration of the current collector will be described with reference to the positive electrode 10 by way of example, but a similar configuration is also applicable to the negative electrode 30. The following configuration may be applied to both of the positive electrode 10 and the negative electrode 30. FIG. 2 is a side sectional view showing the form of the positive electrode 10 according to the present embodiment. As shown in FIG. 2, the positive electrode 10 has a mixture layer 11 impregnated with a positive electrode material mixture and a non-mixture-impregnated portion formed by a tab converging portion 12 and a tab portion 13 and not impregnated with the positive electrode material mixture.

[Mixture Layer]

The electrode material mixture with which the mixture layer 11 is impregnated contains at least an electrode active material. The electrode material mixture applicable to the present embodiment may contain other components as necessary as long as the electrode material mixture contains the electrode active material as an essential component. These other components are not particularly limited as long as these components can be used when the lithium ion secondary battery is produced. Examples of these components include an electrolyte, a conductive auxiliary agent, and a binder.

The positive electrode material mixture forming the positive electrode 10 contains at least a positive electrode active material, and as other components, may contain a solid electrolyte, a conductive auxiliary agent, a binder, etc. The positive electrode active material is not particularly limited as long as the positive electrode active material can occlude/release lithium ions, and examples thereof may include $LiCoO_2$, $Li(Ni_{5/10}Co_{2/10}Mn_{3/10})O_2$, $Li(Ni_{6/10}Co_{2/10}Mn_{2/10})O_2$, $Li(Ni_{8/10}Co_{1/10}Mn_{1/10})O_2$, $Li(Ni_{0.8}Co_{0.15}Al_{0.05})O_2$, $Li(Ni_{1/6}Co_{4/6}Mn_{1/6})O_2$, $Li(Ni_{1/3}Co_{1/3}Mn_{1/3})O_2$, $LiCoO_4$, $LiMn_2O_4$, $LiNiO_2$, $LiFePO_4$, lithium sulfide, and sulfur.

A negative electrode material mixture forming the negative electrode 30 contains at least a negative electrode active material, and as other components, may contain a solid electrolyte, a conductive auxiliary agent, a binder, etc. The negative electrode active material is not particularly limited as long as the negative electrode active material can occlude/release lithium ions, and examples thereof may include metallic lithium, lithium alloy, metal oxide, metal sulfide, metal nitride, Si, SiO, and carbon materials such as synthetic graphite, natural graphite, hard carbon, and soft carbon.

[Non-Mixture-Impregnated Portion]

The non-mixture-impregnated portion is a region where the inside of the metal porous body is not impregnated with the electrode material mixture and no electrode material mixture is present. The non-mixture-impregnated portion is formed in a shape as shown in FIG. 2 in such a manner that the metal porous body is pressed after part of the metal porous body has been impregnated with the electrode material mixture. By pressing as described above, the density of the filled electrode material mixture is improved, and the electrode is formed thin. The non-mixture-impregnated portion includes the tab converging portion 12 and the tab portion 13. The tab portion 13 is, by welding, electrically connected to a lead tab (not shown). The tab converging portion 12 is formed between the tab portion 13 and the mixture layer 11 when the tab portion 13 is formed.

The surface roughness Ra of the non-mixture-impregnated portion is preferably equal to or less than the surface roughness of the mixture layer 11. The surface roughness Ra can be measured as an arithmetic average roughness Ra measured according to JIS-B0601:2001.

The tab converging portion 12 is formed between the tab portion 13 and the mixture layer 11. The tab converging portion 12 is formed continuously to the mixture layer 11 and the tab portion 13, and is formed such that the thickness thereof decreases from, the mixture layer 11 toward the tab portion 13. Moreover, the tab converging portion 12 is formed such that the density of the metal portion of the metal porous body increases from the mixture layer 11 toward the tab portion 13.

As shown in FIG. 2, the tab portion 13 is formed at a portion apart from the mixture layer 11 in the positive electrode 10. Since the tab portion 13 is not impregnated with the electrode material mixture, the tab portion 13 is formed with a smaller thickness than that of the mixture layer 11 by pressing of the metal porous body. Moreover, the tab portion 13 has a higher density of the metal portion of the metal porous body than that, of the mixture layer 11, and is formed with a uniform metal density. The tab portion 13 is, by welding, electrically connected to the tab lead (not shown).

At least any of the tab converging portion 12 and the tab portion 13 preferably has the surface roughness Ra equal to or less than 1/10 of the thickness of the mixture layer 11. With this configuration, when the electrode is stacked, occurrence of short-circuit due to contact of the tab converging portion 12 and the tab portion 13 with other electrodes and occurrence of contamination due to cutting of a wire of the metal porous body can be reduced. The thickness of the mixture layer 11 is normally about several hundreds of μm. Thus, the surface roughnesses Ra of the tab converging portion 12 and the tab portion 13 are set equal to or less than 1/10 of the thickness of the mixture layer 11, and therefore, the surface roughnesses Ra of the tab converging portion 12 and the tab portion 13 can be equal to or less than several tens of μm. Thus, the above-described configuration can reduce contact of the tab converging portion 12 and the tab portion 13 with other electrodes and can reduce occurrence of short-circuit and contamination, considering even a stacking error. In addition, improper welding when the tab portion 13 and the lead tab are welded to each other can be reduced.

At least any of the tab converging portion 12 and the tab portion 13 preferably has the surface roughness Ha less than an average wire diameter which is the average of metal wire diameters of the metal porous body. Note that the metal wire diameter means the size of the diameter of the linear metal portion in the metal porous body including the metal portion and the vacancy portion. With this configuration, short-circuit due to contact of the tab converging portion 12 and the tab portion 13 with other electrodes, contamination, etc. can be reliably prevented because of a metal wire not protruding from a surface. In addition, improper welding when the tab portion 13 and the lead tab are welded to each other can be more preferably reduced.

At least any of a surface 121 of the tab converging portion 12 and a surface 131 of the tab portion 13 is preferably filled with a filler. With this configuration, the surface roughnesses Ra of the tab converging portion 12 and the tab portion 13 can be easily adjusted. For example, at least any of an insulator and a thermal conductor is preferably used as the filler. The insulator is used as the filler so that short-circuit can be more preferably reduced. The thermal conductor with a high thermal conductivity is used as the filler so that heat generated at the mixture layer 11 can be efficiently released to the outside through the tab converging portion 12 and the tab portion 13.

Examples of the filler include synthetic resin. These examples may further include, but not limited to, polyimide-based resin, epoxy-based resin, silicone-based resin, and polyurethane-based resin in the case of thermosetting resin; polyolefin-based resin, polystyrene-based resin, fluorine-based resin, polyvinyl chloride-based resin, polymethacry-late-based resin, and polyurethane-based resin in the case of thermoplastic resin; and silicone-based resin, polymethacry-late-based resin, and polyester-based resin in the case of light curing resin.

Examples of the thermal conductor with the high thermal conductivity as the filler include highly thermal conductive resin materials having a thermal conductivity of equal to or greater than 30 W/mK, such as highly thermal conductive polycarbonate (PC) resin, highly thermal conductive poly-butylene telephthalate (PBT) resin, highly thermal conductive polyamide (PA) resin, polyphenylene sulfide (PPS) resin, and a highly thermal conductive silicone material. Preferably, the highly thermal conductive resin material also has electrical insulation,

[Lithium Ion Secondary Battery]

As the lithium ion secondary battery to which the lithium ion secondary battery electrode according to the present embodiment is applied, a lithium ion secondary battery 1 having solid electrolytes will be described below by way of example.

As shown in FIG. 1, the lithium ion secondary battery according to the present embodiment has a stack of the positive electrodes 10 and the negative electrodes 30 as lithium ion secondary battery electrodes and the solid electrolytes 20 each of which is arranged between adjacent ones of the positive electrodes 10 and the negative electrodes 30.

[Electrolyte]

The electrolyte used for the lithium ion secondary battery according to the present embodiment may be a liquid electrolytic solution obtained in such a manner that an electrolyte is dissolved in a nonaqueous solvent or a solid electrolyte as an electrolyte in a solid or gel form. In the present embodiment, the solid electrolyte 20 as the electrolyte is, as shown in FIG. 1, stacked between the positive electrode 10 and the negative electrode 30, and is in the form of a layer, for example. The solid electrolyte 20 is a layer containing at least a solid electrolyte material. Charge transfer between the positive electrode active material and the negative electrode active material is allowed through the solid electrolyte material.

The solid electrolyte material is not particularly limited, and examples thereof may include a sulfide solid electrolyte material, an oxide solid electrolyte material, a nitride solid electrolyte material, and a halide solid electrolyte material.

In a case where the liquid electrolytic solution is used as the electrolyte, examples of the electrolyte dissolved in the nonaqueous solvent may include, but limited to, $LiPF_6$, $LiBF_4$, $LiClO_4$, $LiN(SO_2CF_3)$, $LiN(SO_2C_2F_5)_2$, $LiCF_3SO_3$, $LiC_4F_9SO_3$, $LiC(SO_2CF_3)_3$, LiF, LiCl, LiI, $Li_2S$, $Li_3N$, $Li_3P$, $Li_{10}GeP_2S_{12}$(LGPS), $Li_3PS_4$, $Li_6PS_5Cl$, $Li_7P_2S_8I$, $Li_xPO_6N_z$ (x=2y+3z−5), LiPON, $Li_7La_3Zr_2O_{12}$ (LLZO), $Li_{3x}La_{2/3-x}TiO_3$ (LLTO), $Li_{0.4x}Al_xTi_{2-x}(PO_4)_3$ (0≤x≤1, LATP), $Li_{1.5}Al_{0.5}Ge_{1.5}(PO_4)_3$ (LAGP), $Li_{1+x+y}Al_xTi_{2-x}SiyP_{3-y}O_{12}$, $Li_{1+x+y}Al_x(Ti,Ge)_{2-x}SiyP_{3-y}O_{12}$, and $Li_{4-2x}Zn_xGeO_4$ (LISICON). The above-described electrolytes may be used alone, or two or more types of the electrolytes may be used in combination.

Examples of the nonaqueous solvent contained in the electrolytic solution may include, but not limited to, aprotic solvents such as carbonates, esters, ethers, nitriles, sulfones, and lactones. Specific examples may include ethylene carbonate (EC), propylene carbonate (PC), diethyl carbonate (DEC), dimethyl carbonate (DMC), ethylmethyl carbonate (EMC), 1,2-dimethoxyethane (DME), 1,2-diethoxyethane (DEE), tetrahydrofuran (THE), 2-methyltetrahydrofuran, dioxane, 1,3-dioxolane, diethylene glycol, dimethyl ether, ethylene glycol dimethyl ether, acetonitrile (AN), propionitrile, nitromethane, N,N-dimethylformamide (DMF), dimethylsulfoxide, sulfolane, and γ-butyrolactone. The above-described nonaqueous solvents may be used alone, or two or more types of the nonaqueous solvents may be used in combination.

In addition to the above-described configuration, the lithium ion secondary battery 1 has lead tabs and an exterior body. The lead tabs are, on one end side, electrically connected to the tab portions of the positive electrodes 10 and the negative electrodes 30 by, e.g., welding, and on the other end side, extend from the exterior body to form electrode portions. The lead tab is not particularly limited, and for example, a linear plate-shaped member having flexibility, such as aluminum or copper, is used for the lead tab. The exterior body houses the stack of the positive electrodes 10, the solid electrolytes 20, and the negative electrodes 30 and part of the lead tabs. The exterior body is not particularly limited, and examples thereof may include a laminated cell including a laminated film. In a case where the liquid electrolytic solution is used as the electrolyte of the lithium ion secondary battery, the lithium ion secondary battery according to the present embodiment may include separators. The separator is positioned between the positive electrode and the negative electrode. The material, thickness, etc. of the separator are not particularly limited, and a well-known separator available for the lithium ion secondary battery can be applied.

<Method for Manufacturing Lithium Ion Secondary battery Electrode>

The method for manufacturing the lithium ion secondary battery electrode according to the present embodiment includes the electrode material mixture impregnation step of impregnating part of the current collector as the metal porous body with the electrode material mixture and the press step of pressing the current collector. Further, the method preferably includes, before the press step, the filler filling step of filling at least the surface of the non-mixture-impregnated portion with the filler.

[Electrode Material Mixture Impregnation Step]

The electrode material mixture impregnation step is the step of impregnating part of the current collector as the metal porous body with the electrode material mixture to form the mixture layer. The method for impregnating the metal porous body with the electrode material mixture is not particularly limited, and examples thereof may include a method in which pressure is applied using a plunger type die coater to impregnate the pores of the metal porous body with slurry containing the electrode material mixture and a method in which the pores of the metal porous body are impregnated with the electrode material mixture by dipping.

[Filler Filling Step]

The filler filling step is the step of filling the non-mixture-impregnated portion, which is not impregnated with the electrode material mixture, of the metal porous body with the filler. The filler filling step is preferably performed before the later-described press step. By this step, the pores to which no pressure is normally applied are filled with the filler, and therefore, the pressure is uniformized and the roughness of the electrode surface is easily decreased. In addition, the porosity of the tab converging portion decreases toward the tab portion. Thus, if the filler filling step is performed after the press step, it is less likely to fill the pores with the filler on a tab side and the pores cannot be uniformly filled with the filler. The filler filling step is performed before the press step so that the tab converging portion can be uniformly filled with the filler.

The method for filling the non-mixture-impregnated portion with the filler at the filler filling step is not particularly limited, and examples thereof may include, as in the electrode material mixture impregnation step, a method in which pressure is applied using a plunger type die coater to fill the non-mixture-impregnated portion with the filler and a method in which the non-mixture-impregnated portion is filled with the filler by dipping. Note that the metal wire diameter of the metal porous body at the non-mixture-impregnated portion is decreased before the filler filling step or the porosity of the metal porous body at the non-mixture-impregnated portion is increased. In this manner, the non-mixture-impregnated portion can be easily filled with the filler.

[Press Step]

The press step is the step of pressing the current collector partially impregnated with the electrode material mixture by a method such as roll press. At the press step, pressing is preferably performed such that the surface roughness Ra of the non-mixture-impregnated portion reaches equal to or less than $1/10$ of the thickness of the mixture layer. Alternatively, at the press step, pressing is preferably performed such that the surface roughness Ra of the non-mixture-impregnated portion reaches equal to or less than the average wire diameter of the metal porous body. For adjustment of the surface roughness Ra as described above, a pressure when the non-mixture-impregnated portion of the current collector is pressed or a temperature upon pressing is adjusted, for example. In a case where the pressure and the temperature upon pressing are constant, the surface roughness Ra may be adjusted as described above in such a manner that the type of filler is selected or the porosity or wire diameter of the metal porous body at the non-mixture-impregnated portion is adjusted.

The method for manufacturing the lithium ion secondary battery electrode according to the present embodiment may further include steps other than the above-described steps. For example, instead of the filler filling step, the method may include the step of adjusting the surface roughness Ra of the non-mixture-impregnated portion in such a manner that part of the surface of the current collector is corroded or dissolved by a chemical substance such as acid or halogen. Alternatively, the method may include the step of adjusting the surface roughness Ra of the non-mixture-impregnated portion in such a manner that the filler in the pores of the porous body is dissolved using, e.g., an organic solvent and is smoothed.

The preferred embodiment of the present invention has been described above, but the contents of the present invention are not limited to the above-described embodiment and changes can be made to the present invention as necessary.

EXPLANATION OF REFERENCE NUMERALS

1 Lithium Ion Secondary Battery
10 Positive Electrode (Lithium ion Secondary Battery Electrode)
11 Mixture Layer
12 Tab Converging Portion (Non-Mixture-Impregnated Portion)
13 Tab Portion (Non-Mixture-Impregnated Portion)
20 Solid Electrolyte
30 Negative Electrode (Lithium Ion Secondary Battery Electrode)

What is claimed is:

1. An electrode used for a lithium ion secondary battery, comprising:
    a current collector formed of a metal porous body, the metal porous body comprising a linear metal portion and pores, the pores being formed continuously with each other, the current collector having a mixture layer impregnated with an electrode material mixture containing an electrode active material in the pores of the metal porous body and a non-mixture-impregnated portion not impregnated with the electrode material mixture in the pores of the metal porous body,
    wherein a surface roughness Ra of the non-mixture-impregnated portion is equal to or less than a surface roughness of the mixture layer,
    the non-mixture-impregnated portion includes a tab portion having a higher metal density than that of the mixture layer and a tab converging portion formed between the mixture layer and the tab portion, and
    a surface roughness Ra of the tab converging portion is equal to or less than an average wire diameter of the linear metal portion of the metal porous body.

2. The lithium ion secondary battery electrode according to claim 1, wherein
    the non-mixture-impregnated portion includes a tab portion having a higher metal density than that of the mixture layer and a tab converging portion formed between the mixture layer and the tab portion, and
    a surface roughness Ra of the tab converging portion is equal to or less than $1/10$ of a thickness of the mixture layer.

3. The lithium ion secondary battery electrode according to claim 1, wherein
    the non-mixture-impregnated portion includes a tab portion having a higher metal density than that of the mixture layer and a tab converging portion formed between the mixture layer and the tab portion, and
    a surface roughness Ra of the tab portion is equal to or less than $1/10$ of a thickness of the mixture layer.

4. The lithium ion secondary battery electrode according to claim 1, wherein
    the non-mixture-impregnated portion includes a tab portion having a higher metal density than that of the mixture layer and a tab converging portion formed between the mixture layer and the tab portion, and
    a surface roughness Ra of the tab portion is equal to or less than an average wire diameter of the metal porous body.

5. The lithium ion secondary battery electrode according to claim 1, wherein at least a surface of the non-mixture-impregnated portion is filled with a filler.

6. The lithium ion secondary battery electrode according to claim 5, wherein the filler is at least any of an insulator and/or a thermal conductor.

\* \* \* \* \*